United States Patent
Hsu et al.

(10) Patent No.: US 6,587,684 B1
(45) Date of Patent: Jul. 1, 2003

(54) DIGITAL WIRELESS TELEPHONE SYSTEM FOR DOWNLOADING SOFTWARE TO A DIGITAL TELEPHONE USING WIRELESS DATA LINK PROTOCOL

(75) Inventors: Jay Hsu, Bedminister, NJ (US); Stanley Zadrozny, Lake Hopatrong, NJ (US)

(73) Assignee: Bell Atlantic Nynex Mobile, Bedminister, NJ (US)

( * ) Notice: Subject to any disclaimer, the term of this patent is extended or adjusted under 35 U.S.C. 154(b) by 0 days.

(21) Appl. No.: 09/123,454

(22) Filed: Jul. 28, 1998

(51) Int. Cl.[7] ................................................. H04Q 7/20
(52) U.S. Cl. ........................ 455/419; 370/401; 370/328
(58) Field of Search ................................. 370/401, 402, 370/403, 404, 338, 351, 352, 353, 354, 355, 356, 328, 400; 455/560, 561, 418, 419, 420; 709/209, 223

(56) References Cited

U.S. PATENT DOCUMENTS

| | | | |
|---|---|---|---|
| 5,109,403 A | 4/1992 | Sutphin ........................ 370/59 |
| 5,454,024 A | 9/1995 | Lebowitz ..................... 370/40 |
| 5,465,401 A | 11/1995 | Thompson ................... 455/89 |
| 5,524,135 A | 6/1996 | Mizikovsky et al. ......... 379/58 |
| 5,533,029 A | 7/1996 | Gardner ..................... 370/94.1 |
| 5,544,222 A | 8/1996 | Robinson et al. ............. 379/58 |
| 5,590,133 A * | 12/1996 | Billstrom et al. ........... 370/401 |
| 5,594,779 A | 1/1997 | Goodman .................... 379/59 |
| 5,603,084 A | 2/1997 | Henry, Jr. et al. ......... 455/33.1 |
| 5,684,799 A | 11/1997 | Bigham et al. ........... 370/397 |
| 5,689,825 A | 11/1997 | Averbuch et al. ............. 455/89 |
| 5,722,084 A | 2/1998 | Chakrin et al. ............. 455/551 |
| 5,726,984 A | 3/1998 | Kubler et al. ................ 370/349 |
| 5,729,536 A | 3/1998 | Doshi et al. ................. 370/328 |
| 5,729,549 A | 3/1998 | Kostreski et al. ........... 370/522 |
| 5,732,074 A * | 3/1998 | Spaur et al. ................. 370/313 |
| 5,794,142 A | 8/1998 | Vanttila et al. ............. 455/419 |
| 5,887,254 A * | 3/1999 | Halonen ..................... 455/419 |
| 5,896,566 A * | 4/1999 | Averbuch et al. ........... 455/419 |
| 5,910,946 A * | 6/1999 | Csapo ........................ 370/328 |
| 6,023,620 A * | 2/2000 | Hansson ..................... 455/419 |
| 6,031,830 A * | 2/2000 | Cowan ........................ 370/338 |
| 6,078,820 A * | 6/2000 | Wells et al. ................. 455/466 |
| 6,138,009 A * | 10/2000 | Birgerson .................... 455/419 |
| 6,292,833 B1 * | 9/2001 | Liao et al. ................... 709/229 |
| 6,370,389 B1 * | 4/2002 | Isomursu et al. ........... 455/466 |

* cited by examiner

*Primary Examiner*—Steven Nguyen
*Assistant Examiner*—Duc Duong
(74) *Attorney, Agent, or Firm*—McDermott, Will & Emery

(57) ABSTRACT

A digital wireless telephone downloads software related to digital telephone services using a client browser. The digital telephone initiates a data call to an interworking unit via a digital wireless telephone network, using a prescribed wireless data protocol such as IS-95A. The interworking unit recovers the payload of the wireless data packets to establish a two-way data link with the digital telephone. The interworking unit sends data messages to a destination server across a second two-way data link in a packet switched network to establish a two way session between the digital telephone and the destination server. The user of the digital telephone can thus communicate with the server via a two-way application-layer session using hypertext-based messaging. The digital telephone can thus navigate between different servers on the packet switched network for activation of different digital telephone services, and for downloading new software or updating existing software related to the digital telephone services.

35 Claims, 6 Drawing Sheets

DIGITAL WIRELESS TELEPHONE SYSTEM FOR DOWNLOADING SOFTWARE TO A DIGITAL TELEPHONE USING WIRELESS DATA LINK PROTOCOL

TECHNICAL FIELD

The present invention relates to wireless digital communications systems, and in particular to systems and methods for downloading software to portable wireless digital telephones.

BACKGROUND ART

Wireless communication systems are known to comprise wireless communication units, such as in-car mobile and/or hand-held portable radios, that communicate with each other and a fixed infrastructure using wireless communication resources. Many of the user features provided by such wireless communication units are often based on software programs stored and executed within the wireless communication units. That is, algorithms electronically stored in memories are executed by processing devices, such as microprocessors, to realize certain features.

As existing features are improved and new features are developed for wireless communication units, new versions of software become available with increasing frequency. Users of wireless communication units typically desire to receive the newest versions of updated software as quickly and as efficiently as possible in order to take advantage of the improvements.

Prior art approaches for delivering updated software to wireless communication units are not always convenient and/or efficient. One method requires a user to bring the wireless communication unit to a central location, such as a service shop operated by a system administrator or service provider. The unit is then either provided with replacement parts containing the updated software (i.e., replacement memory devices) or physically connected to a device that transfers the updated software to the unit. Regardless of how the updated software is actually transferred, this method is both time-consuming and inconvenient to users since they are typically required to bring their unit in for service during normal work hours.

U.S. Pat. No. 5,689,825 to Averbuch et al. discloses an arrangement for downloading software from a server to a wireless terminal via a land-based public communication network using a battery charger/software downloader. According to Averbuch et al., downloading software via a land-based public communication network and a battery charger/software downloader has the advantage of minimizing inconvenience to the wireless telephone user. Averbuch et al. also asserts that downloading software via the land-based public communications network is advantageous over receiving updated software wirelessly as a special type of data message. According to Averbuch et al., software versions often comprise many megabytes of data, and thus require extensive use of wireless communication resources to send the updated software to a large number of units.

Digital cellular systems have evolved as a more efficient implementation of wireless communication systems over analog cellular systems. Digital cellular systems typically use time-division multiplexed access (TDMA) or code-division multiple access (CDMA) techniques. Digital cellular communication systems overcome the disadvantages in analog cellular systems, including noise susceptibility and limitations in spectrum efficiency. CDMA systems have been standardized according to TIA/EIA/IS-95A ("MOBILE STATION-BASE STATION COMPATIBILITY STANDARD FOR DUAL MODE WIDEBAND SPREAD SPECTRUM CELLULAR SYSTEM"—1995), by the Telecommunications Industry Association ("TIA"), the disclosure of which is incorporated in its entirety herein by reference.

With CDMA, each transmitted signal comprises a different pseudorandom binary sequence, also referred to as a pseudonoise (PN) sequence, that modulates a carrier signal, spreading the spectrum of the waveform. Thus, since each CDMA subscriber unit is assigned a unique PN code, a plurality of subscriber stations can send and receive CDMA signals sharing the same frequency spectrum. If these CDMA signals were viewed in either the frequency or time domain, the multiple access signals would appear to be superimposed on top of each other. The CDMA signals are separated in the receivers of the base stations or the subscriber stations by using a correlator which accepts only signal energy from the selected binary PN sequence and despreads its spectrum. The CDMA signals from other sources, whose codes do not match the selected binary PN sequence, are not despread in bandwidth and as a result, contribute only to the background noise and represent a self-interference generated by the system. CDMA interference therefore can be controlled, with the goal of increasing system capacity, on the basis of the reduction in signal-to-noise ratio caused by other users within the cellular CDMA system. Thus, a goal in any CDMA system is to limit the power output of transmitters in order to minimize the cumulative system noise caused by the other users in the CDMA system.

The use of CDMA has also been proposed for Personal Communication Services (PCS). A proposed standard for a CDMA PCS system has been submitted by the Joint Technical Committee of the TIA, entitled PN-3384, "PERSONAL STATION-BASE STATION COMPATIBILITY REQUIREMENTS FOR 1.8 TO 2.0 GHz CODE DIVISION MULTIPLE ACCESS (CDMA) PERSONAL COMMUNICATIONS SYSTEMS", Nov. 3, 1994, the disclosure of which is incorporated herein by reference. The PCS proposed standard PN-3384 specifies enhanced services including transmission rates up to 14.4 kbps for enhanced speech quality, full data services at rates up to about 13 kbps, and simultaneous transmission of voice and data. The CDMA PCS system is adapted to operate in any of the licensed PCS frequency allocations from the FCC, currently assigned at 1930–1990 MHz band for the forward CDMA channel (base station to subscriber), and 1850–1910 MHz for the reverse CDMA channel (subscriber to base station).

Data service capabilities for an IS-95A system are specified in TIA/EIA/IS-99 ("DATA SERVICES OPTION STANDARD FOR WIDEBAND SPREAD SPECTRU DIGITAL CELLULAR SYSTEMS"—1995), and TIA/EIA/IS-707 ("DATA SERVICE OPTIONS FOR WIDEBAND SPREAD SPECTRUM SYSTEMS"—1997), incorporated in their entirety herein by reference. These standards specify a circuit switched wireless data protocol used by CDMA cellular mobile stations and base stations to provide modem emulation over the CDMA digital cellular telephone. These standards also define procedures for the interface between the base station and mobile switching center (BS/MSC), and an Interworking Function (IWF) that converts the data from the wireless data protocol to a format compatible for the public switched telephone network (PSTN).

Hence, digital telephones can serve as wireless modems that send and receive wireless data packets for portable laptop PCs, where the wireless data packets are sent and received by the digital telephones according to a wireless data protocol such as IS-99 or IS-707. In this case, data frames from the laptop PC are output as wireless data packets by the digital wireless telephone to the wireless digital communications system, and wireless data packets received by the digital wireless telephone from the wireless digital communications system are output by the digital telephone to the laptop PC.

Hence, a customer can connect his or her portable laptop PC to the digital CDMA telephone using an RS-232 cable, and configure the dial-up software resident in the laptop PC to set up the laptop PC to send and receive faxes via the digital wireless telephone in the form of wireless data packets. In addition, a user of a laptop PC may use the digital CDMA phone as a wireless modem to dial into an Internet Service Provider (ISP), or a corporate local area network (LAN) to access Internet or intranet services. The digital cellular or PCS system, upon receiving the wireless data call, connects the call to an Interworking Function (IWF) unit, which performs the necessary tasks to process data and fax transmissions into circuit-switched data and digital fax connections via the public switched telephone network. Hence, a user can browse the Internet or send a fax with the laptop PC using the wireless data connection.

The above-described wireless data protocols, however, contemplate use of the digital telephone as a wireless modem for a mobile computer such as a laptop PC, and do not address the problem of downloading upgraded software directly into the digital telephone. In addition, the standards specify only the protocol of the packet data transmitted via the air interface. Hence, transmission and reception of wireless data is typically performed by executing proprietary call processing software embedded in the digital telephone or the IWF unit. The use of proprietary call processing software limits the flexibility of potential application developers in developing improved software for use by the wireless telephones. Moreover, the use of proprietary call processing software in the digital telephone and the IWF unit requires the digital wireless telephone service providers to rely on the vendors of the proprietary software to maintain the digital wireless telephone infrastructure. For example, a proposed standard TIA/EIA/IS-683 specifies an over-the-air voice service activation procedure by placing a voice call on a CDMA and/or analog voice channel. The implementation of new digital wireless telephone services such as over-the-air activation as specified in IS-683 requires modification of the proprietary software in the infrastructure components, including the digital telephones, the mobile switching center, and the IWF, resulting in increased costs and delays in implementing new digital wireless telephone services.

DISCLOSURE OF THE INVENTION

There is a need for an arrangement in a digital wireless communications system for downloading updated software to a digital wireless telephone in a manner that does not unduly burden wireless communications system resources.

There is also a need for an arrangement in a digital wireless communications system for implementing new digital wireless telephone services with minimal modification to existing digital wireless telephone system infrastructure components, including digital telephones.

There is also a need for an arrangement in a digital wireless communications system enabling a user to select and control the wireless upgrading of digital telephone software in the user's digital telephone.

There is also a need for an arrangement enabling a user to establish a two-way application-layer session between the user's digital telephone and a server via a digital wireless transceiver, where the server can download control software associated with digital telephone services to the digital telephone during the two-way application layer session. Such digital telephone services may encompass over-the-air activation of new services, or the enhancement of existing services.

There is also a need for a digital wireless telephone configured for recovering an executable program selected by the user and associated with digital telephone services from a stream of wireless data packets received from a digital wireless telephone network, and storing the executable program in a nonvolatile memory for execution by the digital wireless telephone.

These and other needs are attained by the present invention, where a digital wireless telephone is configured for sending selection inputs supplied by a user to a server via a digital wireless communications system, and receiving downloaded software from the server based on the selection inputs. The digital telephone initiates a data call to an interworking unit via a wireless telephone network, using a prescribed wireless data protocol, to establish a two-way data link with the interworking unit that is independent of the prescribed wireless data protocol. The interworking unit is configured for generating data messages to a destination server via a packet switched network, for example a proxy gateway, via a second two-way data link to establish a two-way session between the digital telephone and the destination server. The user of the digital telephone can then communicate with the server via the two-way session, for example by sending a request for activation of a prescribed service. The server responds to the request by sending (i.e., downloading) control software associated with digital telephone services to the digital telephone during the two-way session. The digital telephone then recovers the control software from the wireless data packets sent via the wireless telephone network and stores the recovered control software in nonvolatile memory.

A particularly beneficial aspect of the present invention is that the digital wireless telephone is configured for executing multiple software resources that interact by exchanging messages across Application Programming Interfaces (API). One example of such a configuration is the Open Systems Interconnect (OSI) model, where different protocol layers in a prescribed hierarchy interact by exchanging data with adjacent layers. Consequently, each software resource of a digital telephone may interact with its own corresponding infrastructure component via the digital wireless telephone network, enabling the establishment of a virtual two-way communication, independent of the wireless data protocol, between the telephone user interface and a server configured for downloading control software to the digital telephone.

One example of the telephone user interface may be a client browser executable by the digital wireless telephone, enabling a user to navigate a private network in order to select the downloading of different control software elements for respective services of the digital wireless telephone network. Use of the client browser in the digital wireless telephone is particularly effective for over-the-air service activation, where the user selects activation of new digital wireless services. During the activation procedure, the user may use the client browser to interact first with a proxy gateway controlling network access based on prescribed security procedures, followed by interaction with an activation server for downloading of control software associated with activation of new digital wireless services. The user may then use the client browser to interact with an update server configured for downloading updated software for digital telephone components, such as operating system, vacatur software, call processing software, transceiver control software, etc., based on revision information received from the digital telephone.

Hence, a digital telephone user may selectively access servers of a private or public packet switched network via the digital wireless telephone network to download to the digital telephone control software associated with digital telephone services. Hence, the user may customize his or her digital telephone programming based on the desired services. Moreover, the invention enables use of an open platform for digital wireless communications, enabling application developers to develop new software applications for new digital telephone services. Digital telephone users can then download the new software applications as they are made available on a server.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like/elements throughout and wherein.

BEST MODE FOR CARRYING OUT THE INVENTION

Figure 1:
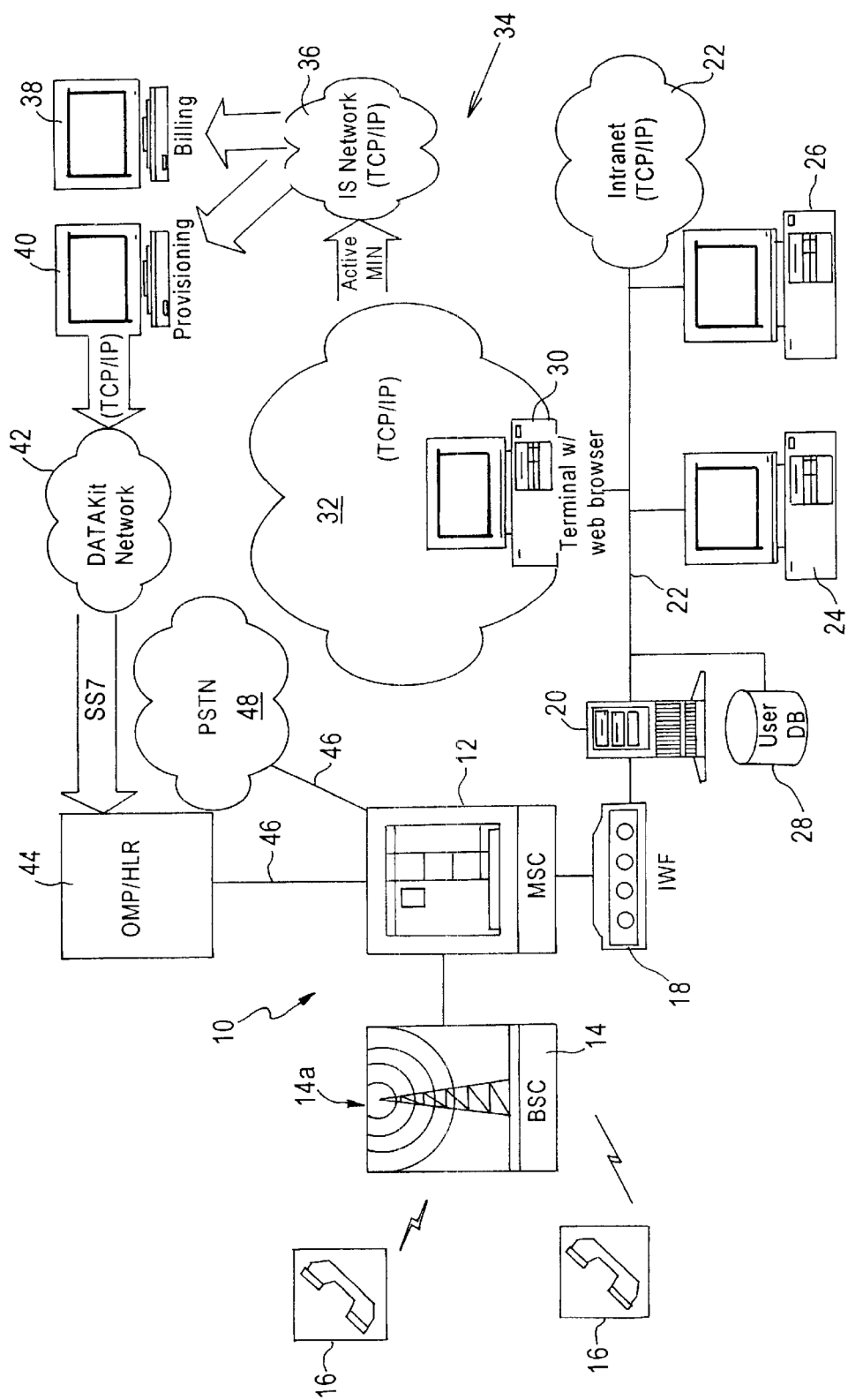
FIG. 1 is a block diagram of a digital wireless communications system configured for programming a digital wireless telephone according to an embodiment of the present invention.

FIG. 1 is a block diagram illustrating a system for wireless activation of digital telephone service for a digital telephone. The system includes a digital wireless telephone network 10 that includes a mobile switching center (MSC) 12, and base station controllers (BSC) 14 having a digital wireless transceiver 14a for transmitting data packets to digital telephones 16. The digital wireless telephone network 10 may be implemented either as a TDMA (time-division multiple access) system or a CDMA (code division multiple access) system. TDMA systems may be implemented using either the Pan-European digital mobile radio system GSM, DSC1800, PCN (personal communication network), or the North American TDMA digital cellular system known as IS-54. Similarly, the CDMA system may be implemented using the known IS-95 standard.

As recognized in the art, both TDMA and CDMA wireless communication systems are designed to overcome the severe effects encountered during transmission across the air interface that cause bit errors in digital data. For example, a digitized voice is processed with a plurality of error correction schemes to ensure that the voice quality is not degraded during propagation across the air interface due to factors such as multi-path interference, fading, etc.

According to the disclosed embodiment, the digital wireless transceiver 14 transmits and receives data streams carrying data packets between the digital wireless telephones according to a prescribed wireless data protocol, such as the above-incorporated CDMA standards I-95A that use I-99 and IS-707. Although these standards can be used to configure the digital telephones 16 as wireless digital modems that send and receive data frames according to CDMA transmission techniques, the disclosed embodiment also uses the wireless data protocol to send and receive data frames for programming the digital telephones 16.

In particular, the digital wireless telephones 16 are configured for selectively accessing one or a plurality of servers for activation of digital telephone services, and for downloading of control software associated with the digital telephone services to the digital telephone 16. As shown in FIG. 1, the system includes an Interworking Function Unit (IWF) 18, configured for establishing a 2-way communication link with the digital telephone according to a prescribed network layer protocol, such as TCP/IP protocol. Specifically, the IWF 18 provides an interworking function, where data packets transmitted by a digital telephone 16 and received by the BSC 14 are routed to the IWF 18 via the MSC 12 based on dialed digits supplied from the digital telephone 16. The IWF 18 is configured for partially decoding the data packets from the wireless data protocol to establish a 2-way communication link with the digital telephone 16 according to a prescribed network layer protocol, described in further detail below with respect to FIG. 2. Specifically, the IWF 18 provides the data functions needed for terminal equipment connected to the wireless CDMA network to interwork with terminal equipment connected to the public switched telephone network 48. In addition, the IWF 18 is configured to assign a temporary IP address to the digital telephone 16,and supply an IP address to the digital telephone 16 for a proxy gateway server 20, enabling the digital telephone 16 to connect to the proxy gateway server 20 according to TCP/IP protocol. Hence, the IWF 18 recovers the TCP/IP messages from the CDMA data packets transported according to radio link protocol (RLP), and transmits the TCP/IP messages to the data proxy gateway 20 according to a prescribed physical layer protocol, for example Ethernet or IEEE 802.3.

The proxy gateway 20 performs protocol translation of the TCP/IP messages from the IWF 18 to recover hypertext transport protocol (HTTP) or hypertext markup language (HTML) protocol messages, generated by the digital telephone 16. The proxy gateway server 20 also performs hypertext-based security, for example using public-key encryption algorithms such as Diffe-Hellman. encryption, to provide a secure two-way client-server application layer session between the proxy gateway server 20 and the digital telephone 16.

In particular, the digital telephone 16 includes a "thin" client browser configured for sending messages to the proxy gateway server 20 in response to user inputs and based on display menu items supplied by the proxy gateway server 20. The thin client browser having a size of about 122 to 200 kilobytes, thus enables the digital telephone 16 to interact with the proxy gateway server 20 using hypertext-based messaging. Moreover, the proxy gateway server 20 selectively controls access by the digital telephone 16 to additional servers via a packet switched network 22 and based on validation of security information supplied by the digital telephone. Hence, the digital telephone 16 may selectively access different servers configured for downloading different control software to the digital telephone based on respective digital telephone services.

As shown in FIG. 1, the proxy gateway server 20 is connected to a TCP/IP based packet switched network 22, such as a private intranet or the Internet. The packet switched network 22 enables the proxy gateway 20 to selectively connect the digital telephone 16 to at least one of a plurality of different servers. Each server in the packet switched network is configured for downloading a particular software for activation or upgrading of a particular digital telephone service. For example, the packet switched network 22 includes a provisioning server 24, a revision control server 26, and a user database 28 configured for storing mobile user information, described below.

The packet switched network 22 may also be in communication with a customer service center 32 of the digital wireless telephone network 10. The customer service center 32, also referred to as a business network, is configured for activating new service for new subscribers, and is configured for communications with other systems supporting network operations and billing functions for the network 10.

For example, the system includes a billing system 38 for billing subscribers based on airtime usage, and a provisioning system 40 configured for provisioning network resources based on the activation and deactivation of subscribers' services. The provisioning system 40 activates new subscribers in response to receiving provisioning requests from the business network 32 via an information service (IS) network 34. The IS network 36 is an internal data network used by customer service representatives to process conventional provisioning requests.

For example, when a customer first obtains service, the customer calls the business office 32 of the cellular or PCS carrier. During this initial voice call, a customer service representative may request the mobile identification number (MIN) assigned to the digital telephone, and may collect user identity and profile information, including information necessary to establish credit worthiness. The representative will then provide the user with an activation code. The representative also sends a provisioning request to the system 36, to request activation of the mobile identification number. The provisioning system 40 processes the provisioning request, and forwards the processed provisioning request via a data network 42, that converts TCP/IP messages to Switch System 7 (SS7) messages, to an operation maintenance provisioning (OMP) system 44. The operations maintenance provisioning system 44 initializes a home location register (HLR) for identifying the newly-registered subscriber having a valid, active account. As recognized in the art, the OMP system 44 may also maintain visitor location registers (VLRs), for digital telephones that are roaming within the wireless telephone network 10. In addition, the OMP/HLR 44 are in communication with the MSC 12 via conventional telephony-based communications links, such as T1 lines 46. As recognized in the art, the MSC 12 also connects to the public switch telephone network (PSTN) 48 via conventional T1 lines 46.

As described below, the embodiment of FIG. 1 enables the user of the digital telephone 16 to perform over the air handset activation in accordance with IS-683. The interim standard IS-683 defined an over the air service provisioning procedure for voice service for a CDMA and/or voice channel. Conventional implementations of this specification would require a software change to the wireless communications infrastructure, including the digital telephones 16 and the mobile switching center 12. The disclosed embodiment, however, enables wireless activation and programming of the digital telephone 16 using the wireless data protocols associated with standard IS-95A, and use of a thin client in the digital telephone 16 to navigate between the servers 20, 24, and/or 26 for downloading software for digital telephone operations. As described below, the downloaded software may be for activation of new service, upgrading existing service, or upgrading existing software stored in the digital telephone 16.

As shown in FIG. 1, the business network 32 includes a terminal 30 having a web browser for navigating the packet switched network 22. Hence, the terminal 30 enables a customer service representative to interface between existing provisioning systems 34 of the wireless telephone network 10, and servers 24 and 26 providing direct programming of the digital telephone 16, via the packet switched network 22. The terminal 30 can thus be used to retrieve usage information from the respective servers 20, 24, 26 related to hosts (i.e., digital telephones 16) having accessed the servers to download software or attempt service activation.

Alternately, the terminal 30 may be used as a network interface for the servers 20, 24, and 26, enabling the servers 20, 24, and 26 to interact with the business network 32 as needed.

Figure 2:
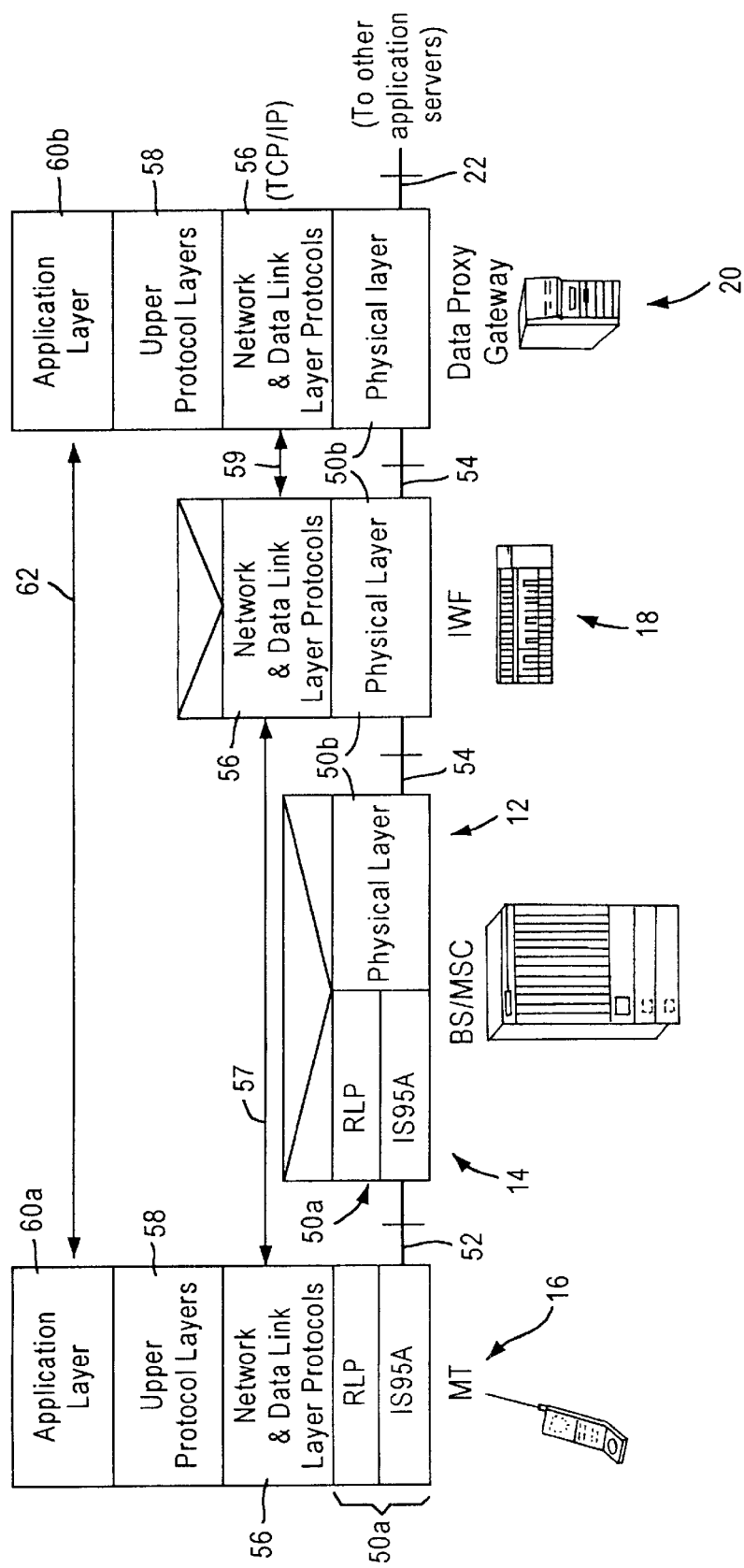
FIG. 2 is a diagram illustrating the exchange of messages between the digital wireless telephone and the system of FIG. 1 on multiple protocol layers.

FIG. 2 is a diagram illustrating the exchange of messages between the digital wireless telephone 16 and the proxy gateway server 20 via the wireless telephone network 10 according to an embodiment of the present invention. As shown in FIG. 2, the digital telephone 16 communicates with the different infrastructure components, via e.g., the BSC 14, the MSC 12, the IWF 18, and the proxy gateway server 20, using multiple layers of protocols. Computer networks also universally employ multiple layers of protocols. A low-level physical layer protocol 50 assures the transmission and reception of a data stream between two devices via a medium, such as the air interface 52, or a wire or fiber-based medium 54. A data link and network layer 56 overlying the physical layer 50 governs transmission of data through the network to ensure end to end reliable data delivery. The relationship between the physical layer 50 and the data link and network layer 56 conforms with the Open Systems Interconnection (OSI) reference model established by the International Standards Organization (ISO).

The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium 52 or 54 and back up the successive layers of the other computer. However, for purposes of design of the various layers and understanding their functions, it is easier to consider each of the layers as communicating with its counterpart at the same level, in a "horizontal" direction.

The lowest layer defined by the OSI model is called the physical layer 50, and is concerned with transmitting raw data bits over the communication channel. Design of the physical layer 50 involves issues of electrical, mechanical or optical engineering, depending on the medium used for the communication channel. The layer next to the physical layer is called the data link layer. The main task of the data link layer is to transform the physical layer 50, which interfaces directly with the channel medium 52 or 54, into a communication link that appears error-free to the next layer above, known as the network layer. The data link layer and the network layer are illustrated in FIG. 2 as a single layer 56 for convenience. The data link layer performs such functions as structuring data into packets or frames, and attaching control information to the packets or frames, such as checksums for error detection, and packet numbers.

The next higher layer, referred to in FIG. 2 as the upper protocol layers 58, include the transport layer, the session layer, and the presentation layer, described below. These layers 58 support communications for the application layer 60, which includes operating system functions for supporting function calls by high-level programs such as client browsers.

The layers of FIG. 2 are used to enable communications between two nodes according to Transmission Control Protocol/Internet Protocol (TCP/IP). Whereas digital telephones to date have served as modems for computers that connected to networks, the present invention uses the digital telephone to directly interact, as a host, to servers on a packet switched network. Hence, the digital telephone 16 is configured to support network transport protocols, such as TCP/IP. Hence, a review of TCP/IP and its routing protocols is necessary to gain an understanding of how the digital telephone 16 interacts with the servers on the packet switched network 22.

TCP/IP was developed by the Department of Defense Advanced Research Projects Agency (ARPA), and was put into government networks such as Arpanet. TCP/IP enables communication between computers in a local area network, referred to as an intranet, and between computers in the Internet.

Internet is a collection of networks, including Arpanet, NSFnet, regional networks such as NYsernet, local networks at a number of university and research institutions, and a number of military networks. The protocols generally referred to as TCP/IP were originally developed for use only through Arpanet and have subsequently become widely used in the industry. The protocols provide a set of services that permit users to communicate with each other across the entire Internet. The specific services that these protocols provide are not important to the present invention, but include file transfer, remote log-in, remote execution, remote printing, computer mail, and access to network file systems.

The basic function of the Transmission Control Protocol (TCP) is to make sure that commands and messages from an application protocol, such as computer mail, are sent to their desired destinations. TCP keeps track of what is sent, and retransmits anything that does not get to its destination correctly. If any message is too long to be sent as one "datagram," TCP will split it into multiple datagrams and makes sure that they all arrive correctly and are reassembled for the application program at the receiving end. Since these functions are needed for many applications, they are collected into a separate protocol (TCP) rather than being part of each application. TCP is implemented in the transport layer of the OSI reference model.

The Internet Protocol (IP) is implemented in the network layer of the OSI reference model, and provides a basic service to TCP: delivering datagrams to their destinations. TCP simply hands IP a datagram with an intended destination; IP is unaware of any relationship between successive datagrams, and merely handles routing of each datagram to its destination. If the destination is a station connected to a different LAN, the IP makes use of routers to forward the message.

TCP/IP is based on a 5-layer variation of the 7-layer OSI reference model as follows:

Layer 5—The Application Layer. Applications such as FTP, telnet, SMTP, and NFS relate to this layer.

Layer 4—The Transport Layer. In this layer, TCP and UDP add transport data to the packet and pass it to layer 3.

Layer 3—The Internet Layer. When an action is initiated on a local host (or initiating host) that is to be performed or responded to on a remote host (or receiving host), this layer takes the package from layer 4 and adds IP information before passing it to layer 2.

Layer 2—The Network Interface Layer. This is the network device as the host, or local computer, sees it and it is through this medium that the data is passed to layer 1.

Layer 1—The Physical Layer. This is literally the Ethernet or Serial Line Interface Protocol (SLIP) itself.

At the receiving host (e.g., the IWF 18 and/or the data proxy gateway 20) the layers are stripped one at a time, and their information is passed to the next highest level until it again reaches the application level. If a gateway such as the IWF 18 exists between the initiating and receiving hosts, the gateway 18 takes the packet from the physical layer 50, and passes it through a data link layer 56 to the IP layer, as is shown in FIG. 2. As a message is sent from the first host (i.e., digital telephone 16) to the second (i.e., gateway 20), gateways pass the packet along by stripping off lower layers, readdressing the lower layer, and then passing the packet toward its final destination.

When a message reaches its destination network, a data link layer address is needed to complete forwarding to the destination host. Data link layer (i.e., layer 56) addresses are 48 bits long and are globally unique, i.e. no two hosts, wherever located, have the same data link layer address. There is a protocol called ARP (address resolution protocol), which obtains a data link layer address from the corresponding network layer address (the address that IP uses). Typically, each router in a TCP/IP network maintains a database table from which it can look up the data link layer address, but if a destination host is not in this ARP database, the router can transmit an ARP request. This message basically means: "will the host with the following network layer address please supply its data link layer address." Only the addressed destination host responds, and the router is then able to insert the correct data link layer address into the message being forwarded, and to transmit the message to its final destination.

IP routing specifies that IP datagrams travel through internetworks one hop at a time (next hop routing) based on the destination address in the IP header. The entire route is not known at the outset of the journey. Instead, at each stop, the next destination (or next hop) is calculated by matching the destination address within the datagram's IP header with an entry in the current node's (typically but not always a router) routing table.

Each node's involvement in the routing process consists only of forwarding packets based on internal information resident in the router, regardless of whether the packets get to their final destination. To extend this explanation a step further, IP routing does not alter the original datagram. In particular, the datagram source and destination addresses remain unaltered. The IP header always specifies the IP address of the original source and the IP address of the ultimate destination.

When IP executes the routing algorithm it computes a new address, the IP address of the machine/router to which the datagram should be sent next. This algorithm uses the information from the routing table entries, as well as any cached information local to the router. This new address is most likely the address of another router/gateway. If the datagram can be delivered directly (e.g. , the destination network is directly attached to the current host) the new address will be the same as the destination address in the IP header.

The next hop address defined by the method above is not stored in the IP datagram. There is no reserved space to hold it and it is not "stored" at all. After executing the routing algorithm (the algorithm is specific to the vendor/platform) to define the next hop address to the final destination. The IP protocol software passes the datagram and the next hop address to the network interface software responsible for the physical network over which the datagram must now be sent.

The network interface software binds the next hop address to a physical address (this physical address is discovered via address resolution protocols (ARP, RARP, etc. ), forms a frame (Ethernet, SMDS, FDDI, etc.—OSI layer 2 physical address) using the physical address, places the datagram in the data portion of the frame, and sends the result out over the physical network interface through which the next hop gateway is reached. The next gateway receives the datagram and the foregoing process is repeated.

In addition, the IP does not provide for error reporting back to the source when routing anomalies occur. This task is left to another Internet protocol, the Internet Control Message Protocol (ICMP).

A router will perform protocol translation. One example is at layers 1 and 2. If the datagram arrives via an Ethernet interface and is destined to exit on a serial line, for example, the router will strip off the Ethernet header and trailer, and substitute the appropriate header and trailer for the specific network media, such as SMDS, by way of example.

With reference to FIG. 2, the MSC 12 is configured for protocol translation between the wireless data protocol implemented in the physical layer 50a, to the physical layer protocol 50b used by the packet switched network 22. As shown in FIG. 2, This protocol translation is performed in the MSC 12, although the protocol translation may also be performed in the IWF 18, such that the MSC 12 provides conventional switching based on the wireless data protocol 50a.

The digital telephone 16 initiates a data call in response to an instruction from the application layer 60a, indicating that data is to be transmitted by the wireless medium 52. As described below, the application 60a requests initiation of the data call in response to execution of a client browser routine, where the browser routine generates the message to the application layer 60a in response to user inputs based on a menu displayed by the client browser. The upper protocols 58 in turn hand the message to the network and data link layer protocols 56, which packetize the message in accordance with TCP/IP protocol. The TCP/IP messages are then packetized into wireless data packets by the physical layer 50a according to the RLP and I-95A wireless data protocols.

The digital wireless transceiver 14 receives the streams of data packets from the digital telephone 16 via the wireless medium 52, and forwards the data packets to the MSC 12 according to the wireless data protocol IS-95A. The MSC 12 strips the packets to recover the data frames at the data link layer 56, and then repacketizes the data frames according to the physical layer protocol 50b, for example Ethernet (IEEE 802.3) protocol, for transmission on the medium 54. The MSC 12 treats the communication as a data call to the IWF unit 18, i.e., by switching the packets through the port connect to the IWF 18.

The IWF 18 receives the data packets from the MSC 12, and strips the data packets to recover the data link and network layer messages transmitted by the digital telephone 16 according to the network and data link protocol 56. Hence, the interworking unit 18 establishes a two-way communication link 57 with the digital telephone according to the network and data link layer protocols 56. As described below, the interworking function 18 uses the two-way data link layer communication link 57 to assign a temporary IP address to the digital telephone 16, enabling the digital telephone 16 to perform IP-based addressing according to TCP/IP protocol.

The IWF 18, in response to receiving an IP datagram from the digital telephone 16 at the corresponding layer 56, determines the destination of the datagram and forwards the datagram to the appropriate destination by the packet switched network, for example the data proxy gateway 20. Hence, the IWF 18 establishes a second two-way communication link 59 at the network and data link layer 56. The two-way network and data link 57 between the digital telephone 16 and the IWF 18, plus the two-way network and data link 59 between the IWF 18 and the data proxy gateway 20 enables the digital telephone 16 and the data proxy gateway 22 to establish a two-way application-layer session 62.

Hence, the digital telephone 16 and the gateway 20 can communicate via the application-layer session 62 by exchanging hypertext based messages, for example HTML or HTTP-based messages, for establishing links to different locations using Internet uniform resource locator (URL)-encoding format. For example, the data proxy gateway 22 can send a menu including a predetermined URL to the digital telephone 16 for security authentication and establishment of a secure link between the digital telephone and servers on the packet switched network 22. As described below, the two-way application layer communication link 62 also enables menu-based programming of the digital telephone 16. In particular, the digital telephone 16 supplies a stream of data packets carrying a selection input generated by a thin browser in response to a user input, and the server addressed by the digital telephone in response downloads the requested software to the digital telephone. The digital telephone 16 recovers the executable downloaded program and stores the recovered program in nonvolatile memory, for subsequent execution by the telephone.

Figure 3:
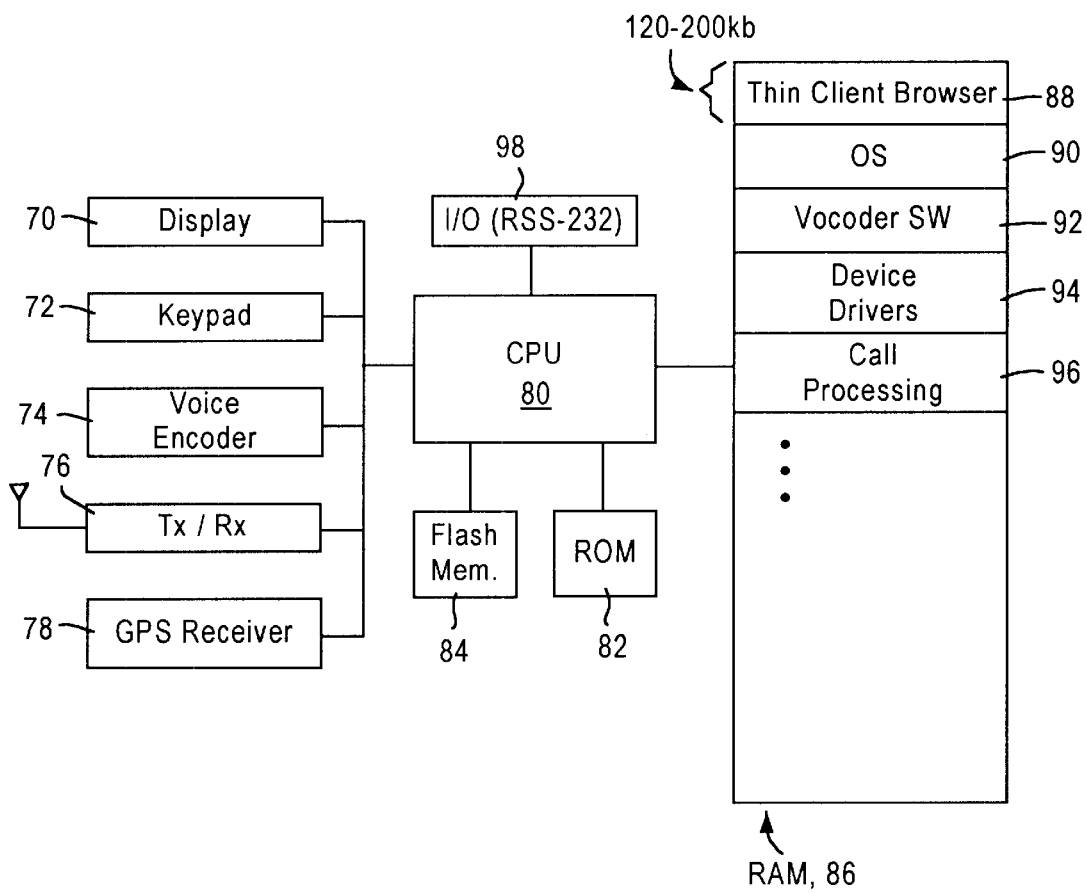
FIG. 3 is a diagram of a digital wireless telephone according to an embodiment of the present invention.

FIG. 3 is a diagram illustrating the digital telephone 16 according to an embodiment of the present invention. As shown in FIG. 3, the digital telephone 16 includes a display 70 for displaying a menu generated by a client browser, a keypad 72 for dialing digits and generating selection inputs keyed by the user based on the displayed menu, a voice encoder 74, a CDMA or TDMA transceiver 76, and a GPS receiver 78. These devices interact under the control of an internal processor 80 configured for controlling digital telephone operations, including executing stored software routines, described below, for activation of the digital telephone, call processing, and navigation of the packet switched network 22. The digital telephone also includes a read-only memory (ROM) 82 for storing basic CPU routines, a flash memory 84, and a non-volatile random access memory 86 for storing executable programs associated with the digital telephone services and digital telephone navigation.

In particular, the random access memory 86 stores client browser software 88, an operating system 90, vocoder software 92, device driver software 94, and call processing software 96. The operating system software 90, executable by the processor 80, supports the execution of the thin client browser software 88, including generation of messages across an application programming interface that specifies recognized routines between the thin client browser 88 and the operating system 90. The call processing software 96 is configured for network and transport operations of the protocols of layer 56 and the generation of the data packets according to TCP/IP protocol based on the messages supplied by the operating system 90. The device driver software 94 is configured for the controlling data transport by the transceiver 76 according to RLP and I-95A protocols.

The digital telephone 16 also includes an I/O interface, for example an RS-232 interface 98, for connecting a digital telephone to a personal computer for transport of facsimile and/data according to IS-686. Hence, the digital telephone 16 can operate as a digital wireless modem when the thin client browser 88 is not in use.

The thin client browser software is executable by the CPU 80 and has a size of about 100–200 kilobytes. The thin client browser 88 uses an internet URL-encoding format, for example device://file/parameters, to communicate between the digital telephone 16 and an addressed server, such as the proxy gateway server 20 or the provisioning server 24. In addition, the browser can be used to connect to the customer service terminal 30 of the business network 32, enabling a user to retrieve phone usage and billing information using a web interface in the terminal 30. The microbrowser 88 uses the URL format, whereas the I-95A delivers OTA messages according to IS-683. Hence, an interpreter interface is present between the microbrowser 88 and the physical layer 50a, where one of the layers includes an interpreter protocol in one of the layers 60a, 58, or 56. For example, in IS-683, the handset sends out a configuration response message in a variable length format to respond to a configuration request message. See, for example, section 3.5.1.1 of IS-683. The configuration response message includes the fields shown in Table 1.

TABLE 1

| Field | Length (bits) |
|---|---|
| OTSAP_MSG_TYPE ('00000000') | 8 |
| NUM_BLOCKS | 8 |
| BLOCK_ID | 8 |
| BLOCK_LEN | 8 |
| PARAM_DATA | 8 × BLOCK_LEN |

The message shown in Table 1 can be encoded as:

"HTTP://provision server address/OTASP_MSG_TYPE+NUM_BLOCKS+BLOCK_ID+BLOCK_LEN+PARAM_DATA A similar approach can be implemented for all OTA messages.

Figure 4A:
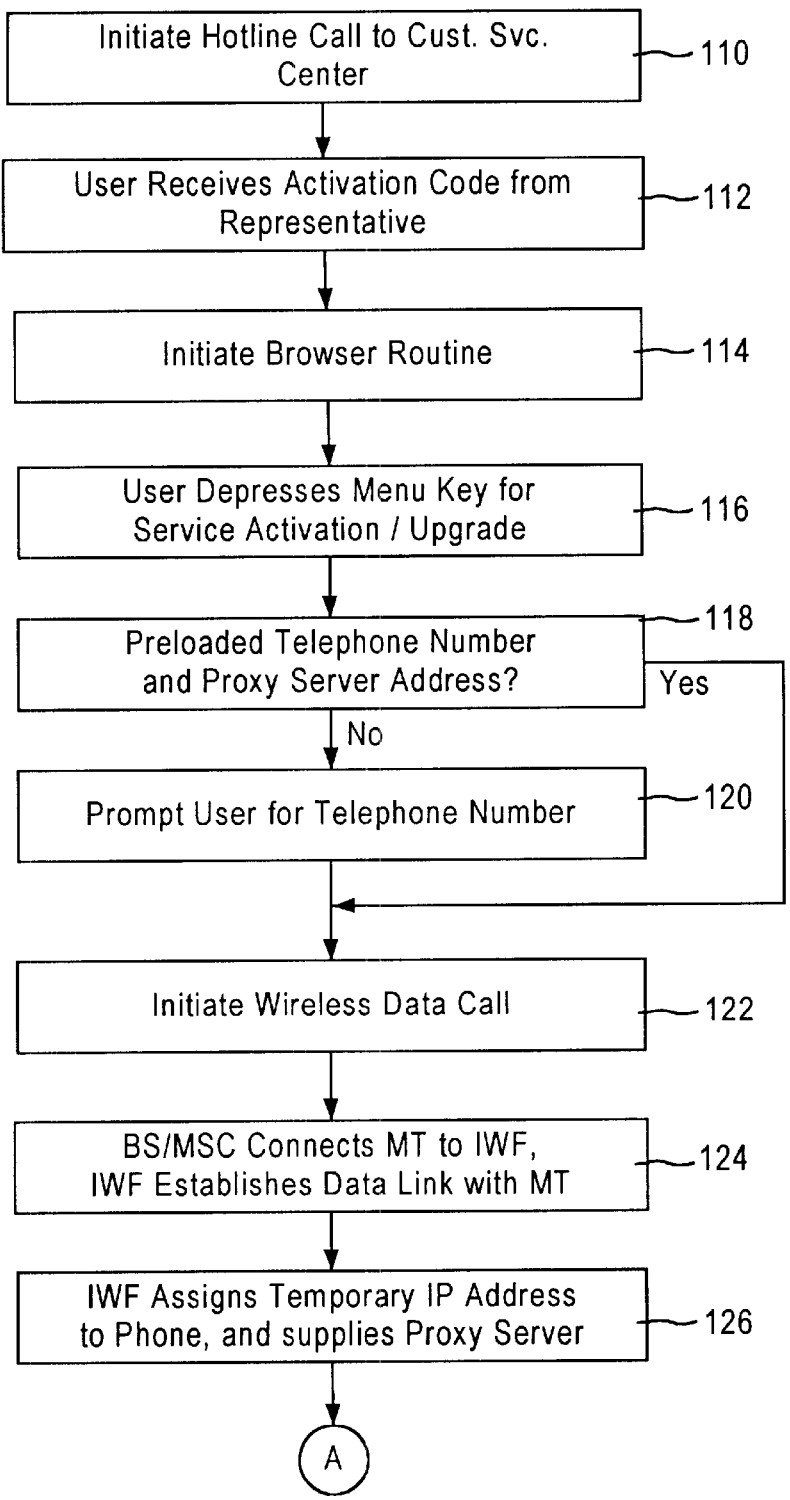
FIGS. 4A, 4B and 4C are flow diagrams summarizing a method for programming a digital wireless telephone according to an embodiment of the present invention.
Figure 4B:
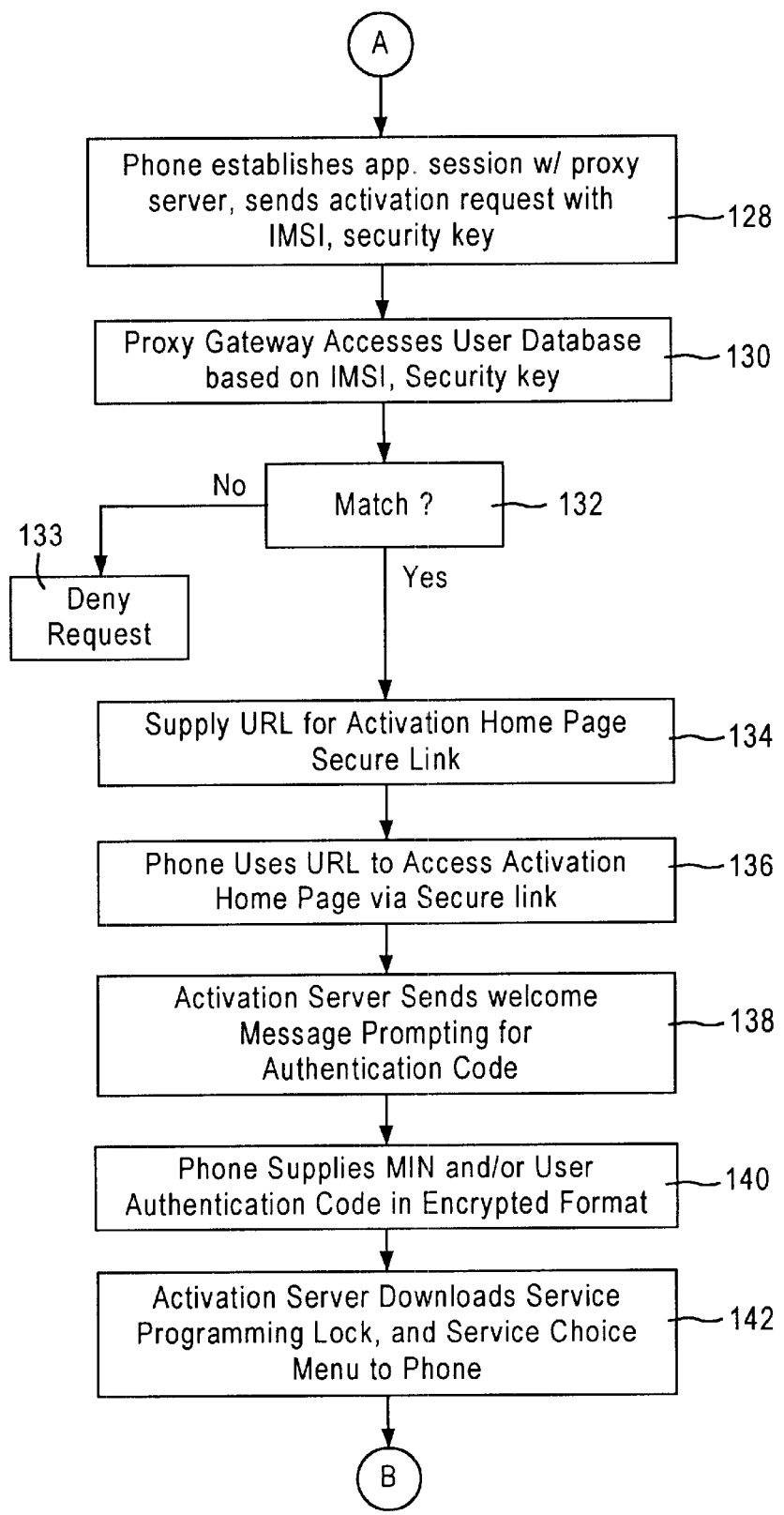
Figure 4C:
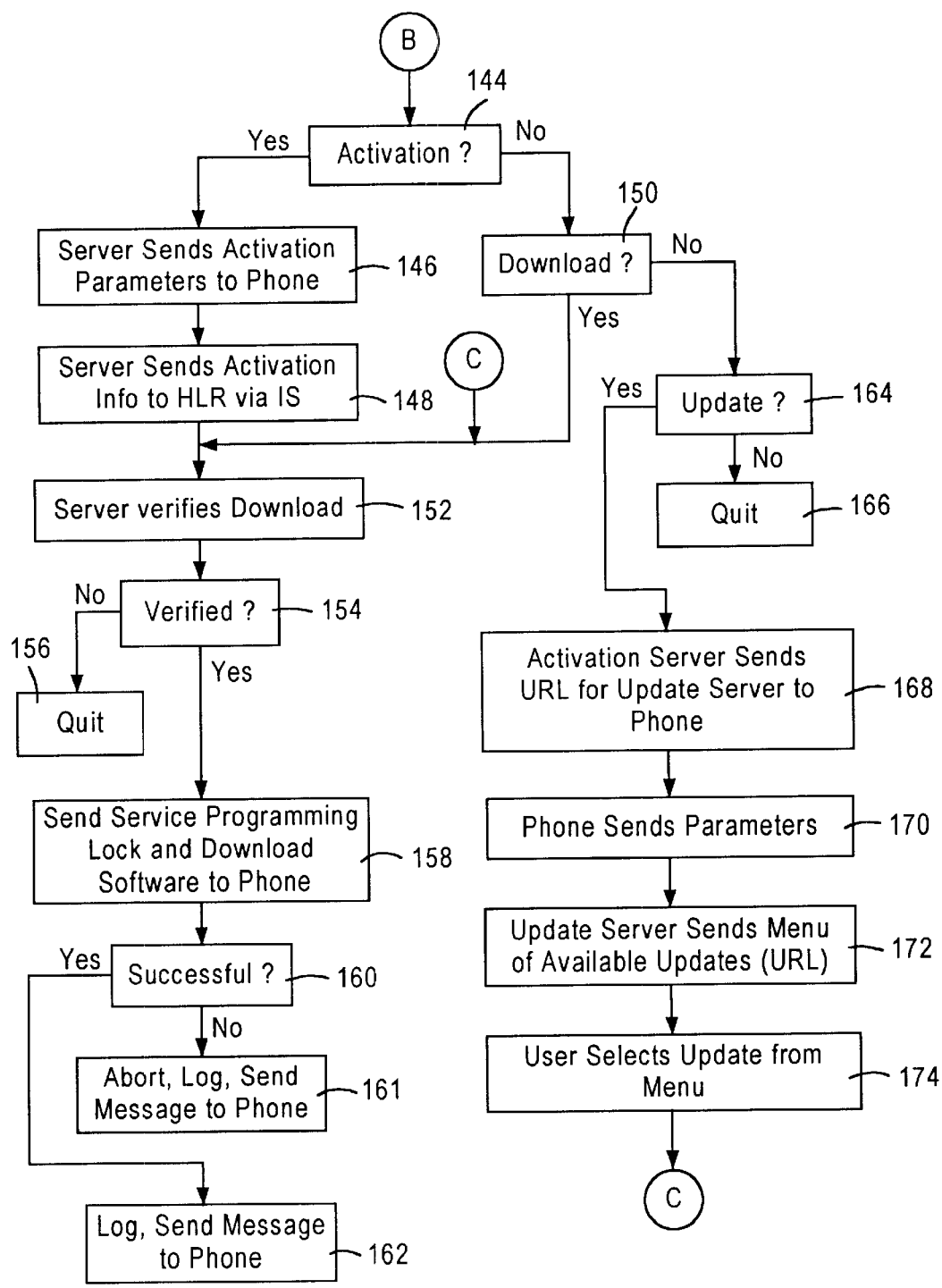

FIGS. 4A, 4B, and 4C are flow diagrams summarizing a method for programming a digital telephone according to a prescribed data protocol according to an embodiment of the present invention. In particular, FIGS. 4A, 4B, and 4C summarize an arrangement for over the air activation of the digital telephone 16, and downloading control software and/or updated software to the digital telephone 16 using a server in communication with the digital telephone 16 according to a two-way application-layer session 62. As described below, the thin client browser software 88 can be used to enable a user of the digital telephone 16 to activate new service (i.e., become authorized for the new service) without the intervention of a third party, such as an authorized dealer. The use of the thin client browser also enables the digital telephone 16 to connect to selected servers via the digital telephone network 10 and the packet data network 22 to download selected control software associated with digital telephone services.

According to the disclosed embodiment, two types of over the air service provisioning procedure will generally be performed, namely activation of new service including voice service with the service provider, and upgrading existing service for which the user already has an established account.

Assuming that a user has purchased the digital telephone 16 and has not initiated any service with the service provider, the user will initiate a hot-line call in step 110 to the customer service center 32 using a predetermined number. The predetermined number may be programmed within the digital telephone and/or the MSC 12 as the only authorized telephone number that may be accessed before activation of the digital telephone 16. The hotline call in step 110 may be terminated as a voice call via the public switched telephone network 48 to an operator at the customer service center 32. Alternatively the hotline call may be terminated as a data call via the IWF 18 and the proxy server 20 to the terminal 30 using the techniques described herein. During the hotline call to the customer service center 32, the user will be prompted either by a live operator or hypertext based messages from the terminal for user identity information and credit-related information (e.g., a credit card number) and security information (e.g., social security number).

Once the customer service center 32 determines that the user has met all necessary criteria for establishment of an account, the customer service center 32 (e.g., a live operator or the terminal 30) sends a provisioning request including an active mobile identification number specifying the physical ID of the digital telephone 16 to the provisioning system 40. The customer service center 32 also sends an activation code to the digital telephone 16 which is received by the digital telephone via the wireless network 10 in step 112. If the activation code is received via a data call, the activation code is stored in the digital telephone memory 16 and/or displayed to the user.

In response to reception of the activation code by the digital telephone 116, the CPU 80 in the digital telephone 16 begins execution of the client browser software 88 in step 114, and displays a predetermined activation to prompt the user for beginning the. activation routine. The user then will press a menu key in step 116 for service activation and/or upgrade in step 116, causing the browser routine to send a request for activation of new service. The operating system 90 then checks if the hotline telephone number for the IWF and proxy server IP address is stored in the memory 84 in step 118. If the telephone number is not stored, then the user is prompted for the telephone number and/or the activation code in step 120. The operating system then causes the call processing software 96 and the device drivers 94 to initiate a wireless data call in step 122 to the IWF 18.

The MSC 12, in response to receiving the incoming wireless data call from the digital telephone 16 via the BSC 14, connects the digital telephone to the IWF 18, causing the IWF to establish a network and/or data link 57 across the layers 56 with the digital telephone 16 in step 124. The IWF 18 then assigns a temporary IP address to the digital telephone 16 to enable the digital telephone 16 to perform IP-based addressing, and supplies the IP address for the proxy server 20, if needed, in step 126.

As shown in FIG. 4B, the digital telephone 16 then establishes an initial two-way application session 62 with the proxy server 20 in step 128. The digital telephone 16 also sends a data activation request with a security key and an international mobile station identity (IMSI). The IMSI is a method of identifying mobile stations in the land to mobile service, as specified in CCITT recommendation E.212. The proxy gateway 20 performs an authentication routine by accessing the user database 88 in step 130 based on the transmitted IMSI and security key. If the IMSI exists in the user database 88, the proxy server 20 checks the transmitted security key with a secret key stored in the database 88. If the transmitted security key does not match the stored secret key in step 132, the proxy server 20 sends a message in step 134 denying the request for activation. The proxy gateway 20 will also access the database 88 to determine if the user is in the active mode, indicating that the subscriber is already activated. If the user is not in an active mode, the proxy server 20 accepts the provisioning request in step 134 by transmitting a uniform resource locator (URL) to the digital telephone 16 and initiates a secure link using the user authenticated code and a public key encryption algorithm, such as the Diffe-Hellman algorithm.

The digital telephone 16 then accesses the activation home page of the provisioning server 24 in step 136 using the supplied URL via the secure link. The activation server 24 establishes a two-way application layer session 62 with the digital telephone 16 by sending a welcome message in step 138 that prompts for the user authentication code. The application layer 60a may then automatically supply the mobile identification number (MIN) and/or user authentication code in encrypted format in step 140 to the provisioning server 24, or the user may manually input the authentication code.

The provisioning server 24, also referred to as the activation server, will then download a service programming lock to the digital telephone. A programming lock is used by the digital telephone for identification of authorized control software sources. Hence, the programming lock is sent to the digital phone 16 to prevent any unauthorized programming to the phone by nonauthorized systems. The activation server 24 will also send a choice menu to the digital telephone for service choices.

As shown in FIG. 4C, the server 24, upon receiving a user selection from the browser of the digital telephone 16, determines in step 144 if the request is an activation request. Assuming the browser request indicates a request for activation, the provisioning server 24 sends activation parameters to the digital telephone in step 146, and sends any relevant activation information to the user's home location register in system 44 via the packet switched network 22 and the IS network 36 in step 148.

Once the activation parameters have been received by the digital telephone 16, the server 24 begins the downloading routine for downloading of control software associated with digital telephone services to the digital telephone. As shown in FIG. 4C, the download routine may also be initiated in step 150 if the server 24 determines that the request transmitted from the digital telephone is a specific download request.

The server 24 begins in step 152 by sending a message to the digital telephone requesting verification that the user wishes to download the software. If in step 154 the server 24 does not verify that the user wishes to continue with the download, the download procedure is aborted in step 156. If at step 154 the server 24 determines that the user verifies to continue with the download procedure, the server 24 sends a service programming lock in step 158 to unlock the digital telephone 16, at which point the server downloads the control software to the digital telephone 16. As described above, the server downloads by sending data packets via the packet switched network 22 according to TCP/IP protocol and the protocol of the physical layer 50b. The IWF 18 or the MSC 12 receive the data packets, strip the payload from the physical layer dependent data packets, and repackets the data in data packets according to the wireless data protocol RLP and I-95A for the physical layer protocol 50a.

The digital telephone 16, upon receiving the stream of data packets from the digital wireless telephone network 10, strips the payload data from the wireless data packets, and sends the payload to the upper layers 56, 58 and 60a. In particular, the processor 80 recovers the executable program from the stream of data packets received by the transceiver 76, and writes the executable program to the nonvolatile memory 86 using the file transfer protocol (FTP) resident in the upper protocol layers 58 and the application layer 60a. As recognized in the art, the server 24 and the digital telephone 16 may use well recognized file transfer protocols.

During the downloading process, the digital telephone 16 and the server 24 interact via the application layer session 62 to ensure that the downloading is successful in step 160. If in step 160 either the digital telephone 16 or the server 24 determine that the download procedure is unsuccessful, the download procedure is aborted in step 161, at which point the server 24 logs the failed attempt and sends a message to the digital telephone 16 that the downloading procedure was aborted. If in step 160 the server determines that the download procedure was successful, the successful downloading is logged by the server 24 in step 162, and a message is sent to the phone that the download was successful.

Hence, the digital telephone is able to use a web-based approach for navigating the packet switched network for selectively accessing different servers on network 22 to obtain control software or other information related to digital telephone services. For example, the digital telephone may obtain billing and usage information by accessing a web page at the terminal 30 for the customer service center 32. The digital telephone 16 may also access a revision control server 26 configured for maintaining the digital telephone 16 with up to date firmware and/or software, including vocoder software 92, browser software 88, device drivers 94, and operating system 90.

As shown in FIG. 4C, the update routine begins in step 164, where the activation server 24 determines whether the digital telephone 16 sends an update request from the menu of available services supplied in step 142. If the message does not correspond to an update request in step 164, the two-way application layer session 62 is quit by the server in step 166. Otherwise, the activation server 24 sends the URL for the update server 26 to the digital telephone in step 168. The digital telephone then sends an update request in step 170 to the update server 26, and includes the telephone revision parameters. The update server 26 initiates a secure link in step 172 and sends a menu of available updates and the respective URLs. The browser 88 then displays the available update to the user on the display 70, enabling the user to select an update in step 174 from the displayed menu.

The server 26 and the digital telephone 16 then interact in the same manner as described above for downloading control software to download the updated software. Hence, the user of the digital telephone 16 can update either the browser application software 88, the operating system software 90, the vocoder software 92, the device driver software 94 or the call processing software 96 by sending the corresponding request in step 174.

According to the disclosed embodiment, a digital telephone having a thin browser requiring only 120–200 kilobytes of executable memory space is able to establish a data connection with a proxy gateway 20, where a converter in the MSC 12 and/or the IWF 18 converts the physical layer transport mechanism from a wireless data protocol 50a to a wired physical layer protocol 50b. Moreover, the digital telephone 16 can establish two-way application layer sessions with servers on the packet switched network 22 for downloading of control software related to digital telephone services. The enhanced flexibility of CDMA transport enables a user of the digital telephone 16 to switch back and forth between voice and data mode, enabling the user to place a voice call while software is being downloaded into the digital telephone 16. Hence, the user may converse with either wireless telephone network representatives, or use the telephone for normal use during the downloading procedure.

Moreover, use of the browser in the digital telephone 16 enables phone users to access all of the features in an intelligent network, as described in IS-41, through the wireless data channel using world wide web of protocol suites, resulting in open extensible, and reliable access. The user-initiated download procedure also reduces burden on wireless resources, since the user-initiated download is more randomly distributed than system-based download procedures.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A system for programming a digital telephone configured for sending and receiving data packets according to a prescribed wireless data protocol, the system comprising:

a digital wireless transceiver configured for transmitting first data packets to the digital telephone according to the prescribed wireless data protocol in response to reception of a first data stream, and outputting a second data stream carrying second data packets transmitted from the digital telephone;

an interworking unit for establishing a two-way communication link with the digital telephone according to a prescribed network layer protocol, the interworking unit outputting the first data packets to the digital wireless transceiver in response to received first network layer messages, and generating second network layer messages based on the second data packets and the prescribed network layer protocol;

a server for establishing a two-way application-layer session with the digital telephone by outputting the first network layer messages and based on the second network layer messages received from the interworking unit, the server downloading control software associated with digital telephone services to the digital telephone during the two-way application layer session; and a proxy gateway in communication with the interworking unit, the proxy gateway selectively controlling access by the digital telephone to the server based on validation of security information supplied by the digital telephone, wherein the interworking unit establishes a virtual connection connecting the digital telephone to the proxy gateway in response to reception of a prescribed address received from the digital telephone via the two-way communication link.

2. The system of claim 1, further comprising a packet switched network for carrying data frames establishing the virtual connection between the interworking unit and the proxy gateway, and data frames between the interworking unit and the server.

3. The system of claim 2, wherein the interworking unit receives the second data packets in IS-95A as said prescribed wireless data protocol, and sends the data frames to the server via the packet switched network according to TCP/IP protocol as said network layer protocol.

4. The system of claim 3, wherein the server sends an instruction to the digital telephone, in response to establishment of the two-way application layer session, to display on the digital telephone a prescribed menu of user inputs.

5. The system of claim 4, wherein the server downloads the control software in response to receiving a corresponding one of the user inputs from the digital telephone.

6. A system for programming a digital telephone configured for sending and receiving data packets according to a prescribed wireless data protocol, the system comprising:

a digital wireless transceiver configured for transmitting first data packets to the digital telephone according to the prescribed wireless data protocol in response to reception of a first data stream, and outputting a second data stream carrying second data packets transmitted from the digital telephone;

an interworking unit for establishing a two-way communication link with the digital telephone according to a prescribed network layer protocol, the interworking unit outputting the first data packets to the digital wireless transceiver in response to received first network layer messages, and generating second network layer messages based on the second data packets and the prescribed network layer protocol;

a server for establishing a two-way application-layer session with the digital telephone by outputting the first network layer messages and based on the second network layer messages received from the interworking unit, the server downloading control software associated with digital telephone services to the digital telephone during the two-way application layer session;

a proxy gateway in communication with the interworking unit, the proxy gateway selectively controlling access by the digital telephone to the server based on validation of security information supplied by the digital telephone; and a user database storing for each user an International Mobile Station Identity (IMSI), a secret key, and a user status, wherein the proxy gateway receives as said security information a transmitted IMSI and a security key from the digital telephone, the proxy gateway accessing the user database based on the transmitted IMSI and security key and in response selectively granting the digital telephone access to the server.

7. The system of claim 6, wherein the proxy gateway supplies a predetermined Uniform Resource Locator (URL)

according to a hypertext protocol to the digital telephone for establishment of a secure link by the digital telephone with the server.

8. The system of claim 7, wherein the server, in response to receiving an encrypted user authentication code from the digital telephone, sends a programming lock to the digital telephone for identification by the digital telephone of authorized control software sources.

9. The system of claim 8, wherein the prescribed wireless data protocol is IS-95A.

10. The system of claim 9, wherein the prescribed network layer protocol is TCP/IP protocol.

11. The system of claim 10, further comprising a packet switched network for carrying the first and second network layer messages according to TCP/IP protocol.

12. A method of programming digital telephone services in a digital telephone in communication with a digital wireless communications system, comprising:
   initiating a two-way network link from the digital telephone to an interworking unit by sending and receiving data packets via a digital wireless base station transceiver according to a prescribed wireless data protocol;
   establishing a two-way session between the digital telephone and a server via the two-way network link by sending from the digital telephone a network address corresponding to the server, the server in communication with the interworking unit via a packet switched data network, wherein the establishing step includes:
      (a) supplying a menu list from the server to the digital telephone;
      (b) executing a browser application stored in the digital telephone and configured for displaying the menu list on the digital telephone; and
      (c) outputting by the browser application a selection input to the server in response to a user selection from the menu list;
   downloading control software associated with the digital telephone services to the digital telephone via the digital wireless base station transceiver in response to the selection input supplied by the digital telephone during the two-way session;
   outputting by the browser application a second selection input to the server in response to a corresponding second user selection from the menu list;
   establishing via the two-way network link a second two-way session between the digital telephone and a second server in communication with the packet switched data network; and
   downloading update software from the second server in response to version information supplied from the digital telephone to the second server.

13. The method of claim 12, wherein the update includes at least one of vocoder software, browser application software, device drivers, and operating system software.

14. A method of programming digital telephone services in a digital telephone in communication with a digital wireless communications system, comprising:
   initiating a two-way network link from the digital telephone to an interworking unit by sending and receiving data packets via a digital wireless base station transceiver according to a prescribed wireless data protocol;
   establishing a two-way session between the digital telephone and a server via the two-way network link by sending from the digital telephone a network address corresponding to the server, the server in communication with the interworking unit via a packet switched data network, wherein the establishing step includes:
      (a) assigning an IP address by the interworking unit to the digital telephone, and forwarding the assigned IP address and a first destination IP address to the digital telephone from the interworking unit;
      (b) establishing an initial two-way session between the digital telephone and a proxy server corresponding to the first destination IP address via the interworking unit;
      (c) authenticating a security status of the digital telephone by the proxy server during the initial two-way session and in response supplying the network address corresponding to the server from the proxy server to the digital telephone; and
      (d) establishing the two-way session between the digital telephone and the server in response to the authenticating step; and
   downloading control software associated with the digital telephone services to the digital telephone via the digital wireless base station transceiver in response to a selection input supplied by the digital telephone during the two-way session.

15. The method of claim 14, wherein the downloading step includes:
   supplying data packets carrying the control software to the interworking unit according to TCP/IP protocol, and
   transmitting the data packets carrying the control software from the digital wireless base station transceiver according to IS-95A protocol.

16. A telecommunications system comprising:
   a digital wireless telephone having a memory for storing a browser for selecting a request from a menu of available requests, and a transceiver for sending a first stream of data packets carrying a selected request and receiving a second stream of data packets;
   a wireless telephone network comprising:
      (a) a digital wireless transceiver for receiving the first stream of data packets and sending the second stream of data packets according to a prescribed wireless data protocol, and
      (b) a mobile switching center for establishing a switched connection between the digital wireless telephone and a destination station based on a dialed input from the digital wireless telephone;
   an interworking unit for establishing a two-way data link with the digital telephone using the switched connection; and
   a server for downloading control software associated with digital telephone services of the wireless telephone network via the interworking unit and the mobile switching center to the digital telephone, wherein:
      the interworking unit establishes the two-way data link according to a prescribed network layer protocol, and
      the interworking unit outputs the first stream of data packets to the digital wireless transceiver in response to received first network layer messages, and generates second network layer messages based on the second stream of data packets and the prescribed network layer protocol.

17. The system of claim 16, wherein the server establishes a two-way application layer session with the digital wireless telephone by outputting the first network layer messages and based on the second network layer messages received from the interworking unit, the server downloading the control software during the two-way application layer session.

18. The system of claim 16, further comprising a proxy gateway in communication with the interworking unit and selectively controlling access by the digital wireless telephone to the server based on validation of security information supplied by the digital wireless telephone.

19. The system of claim 18, wherein the interworking unit establishes a virtual connection for the digital wireless telephone to the proxy gateway in response to reception of a prescribed address from the digital wireless telephone.

20. The system of claim 19, further comprising a packet switched network for carrying data frames establishing the virtual connection between the interworking unit and the proxy gateway, and data frames between the interworking unit and the server.

21. The system of claim 20, wherein the interworking unit receives the second data packets in IS-95A protocol, and sends the data frames to the server via the packet switched network according to TCP/IP protocol.

22. The system of claim 16, wherein the server sends an instruction to the digital telephone to display on the digital telephone a prescribed menu of user inputs.

23. The system of claim 22, wherein the server downloads the control software in response to receiving a corresponding one of the user inputs from the digital telephone.

24. The system of claim 16, further comprising:
- a user database storing for each user an International Mobile Station Identity (IMSI), a secret key, and a user status; and
- a proxy gateway for receiving a transmitted IMSI and a security key from the digital telephone, the proxy gateway accessing the user database based on the transmitted IMSI and security key and in response selectively granting the digital telephone access to the server for the downloading of the control software.

25. The system of claim 24, wherein the proxy gateway supplies a predetermined Uniform Resource Locator (URL) according to a hypertext protocol to the digital telephone for establishment of a secure link by the digital telephone with the server.

26. The system of claim 25, wherein the server, in response to receiving an encrypted user authentication code from the digital telephone, sends a programming lock to the digital telephone for identification by the digital telephone of authorized control software sources.

27. The system of claim 16, wherein the server downloads upgrade software to the digital telephone in response to receiving revision information from the digital telephone.

28. The system of claim 16, wherein the interworking unit includes an interface for converting the first stream of data packets from IS-95 protocol to a physical layer protocol capable of transporting TCP/IP messages to the server, and for outputting the second stream of data packets carrying the control software in the IS-95 protocol.

29. A telecommunications system comprising:
- a digital wireless telephone having a memory for storing a browser for selecting a request from a menu of available requests, and a transceiver for sending a first stream of data packets carrying a selected request and receiving a second stream of data packets;
- a wireless telephone network comprising:
  (a) a digital wireless transceiver for receiving the first stream of data packets and sending the second stream of data packets according to a prescribed wireless data protocol, and
  (b) a mobile switching center for establishing a switched connection between the digital wireless telephone and a destination station based on a dialed input from the digital wireless telephone;
- an interworking unit for establishing a two-way data link with the digital telephone using the switched connection;
- a server for downloading control software associated with digital telephone services of the wireless telephone network via the interworking unit and the mobile switching center to the digital telephone; and
- a proxy gateway in communication with the interworking unit and selectively controlling access by the digital wireless telephone to the server based on validation of security information supplied by the digital wireless telephone.

30. The system of claim 29, wherein the interworking unit establishes a virtual connection for the digital wireless telephone to the proxy gateway in response to reception of a prescribed address from the digital wireless telephone.

31. The system of claim 30, further comprising a packet switched network for carrying data frames establishing the virtual connection between the interworking unit and the proxy gateway, and data frames between the interworking unit and the server.

32. The system of claim 31, wherein the interworking unit receives the second data packets in I-95A protocol, and sends the data frames to the server via the packet switched network according to TCP/IP protocol.

33. A telecommunications system comprising:
- a digital wireless telephone having a memory for storing a browser for selecting a request from a menu of available requests, and a transceiver for sending a first stream of data packets carrying a selected request and receiving a second stream of data packets;
- a wireless telephone network comprising:
  (a) a digital wireless transceiver for receiving the first stream of data packets and sending the second stream of data packets according to a prescribed wireless data protocol, and
  (b) a mobile switching center for establishing a switched connection between the digital wireless telephone and a destination station based on a dialed input from the digital wireless telephone;
- an interworking unit for establishing a two-way data link with the digital telephone using the switched connection;
- a server for downloading control software associated with digital telephone services of the wireless telephone network via the interworking unit and the mobile switching center to the digital telephone;
- a user database storing for each user an International Mobile Station Identity (IMSI), a secret key, and a user status; and
- a proxy gateway for receiving a transmitted IMSI and a security key from the digital telephone, the proxy gateway accessing the user database based on the transmitted IMSI and security key and in response selectively granting the digital telephone access to the server for the downloading of the control software.

34. The system of claim 33, wherein the proxy gateway supplies a predetermined Uniform Resource Locator (URL) according to a hypertext protocol to the digital telephone for establishment of a secure link by the digital telephone with the server.

35. The system of claim 34, wherein the server, in response to receiving an encrypted user authentication code from the digital telephone, sends a programming lock to the digital telephone for identification by the digital telephone of authorized control software sources.

* * * * *